No. 843,402. PATENTED FEB. 5, 1907.
J. LANGRIDGE.
STEAM TRAP.
APPLICATION FILED FEB. 12, 1906.
2 SHEETS—SHEET 1.
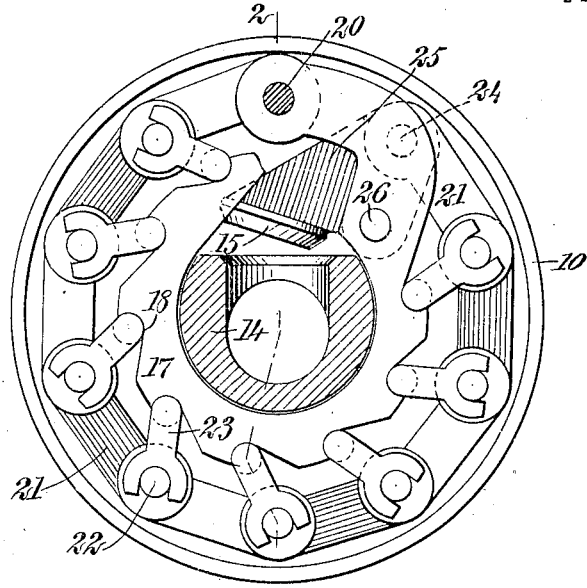
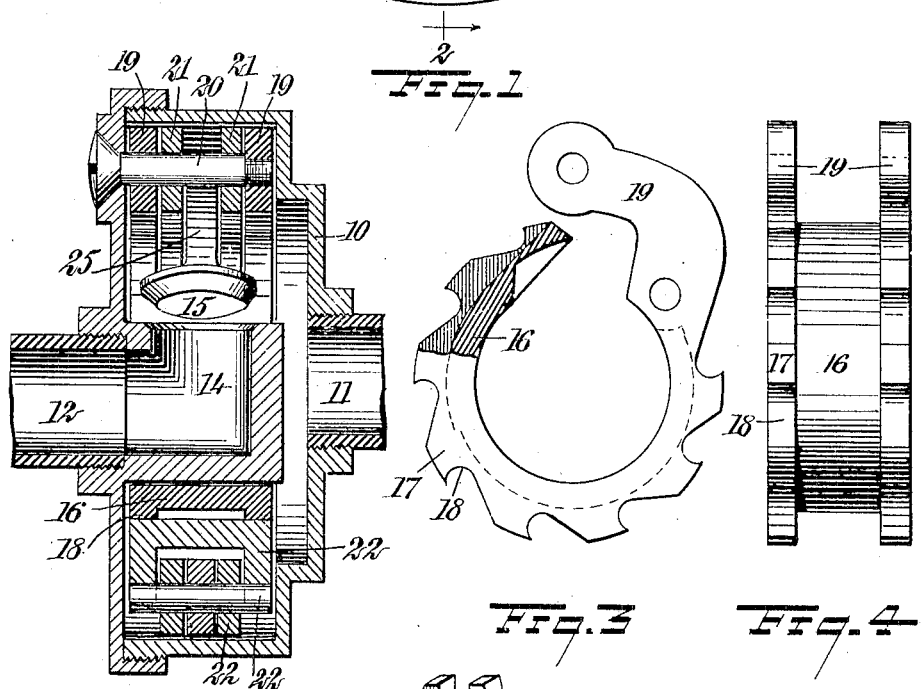
WITNESSES:
INVENTOR
John Langridge
BY
ATTORNEYS No. 843,402. PATENTED FEB. 5, 1907.
J. LANGRIDGE.
STEAM TRAP.
APPLICATION FILED FEB. 12, 1906.
2 SHEETS—SHEET 2.
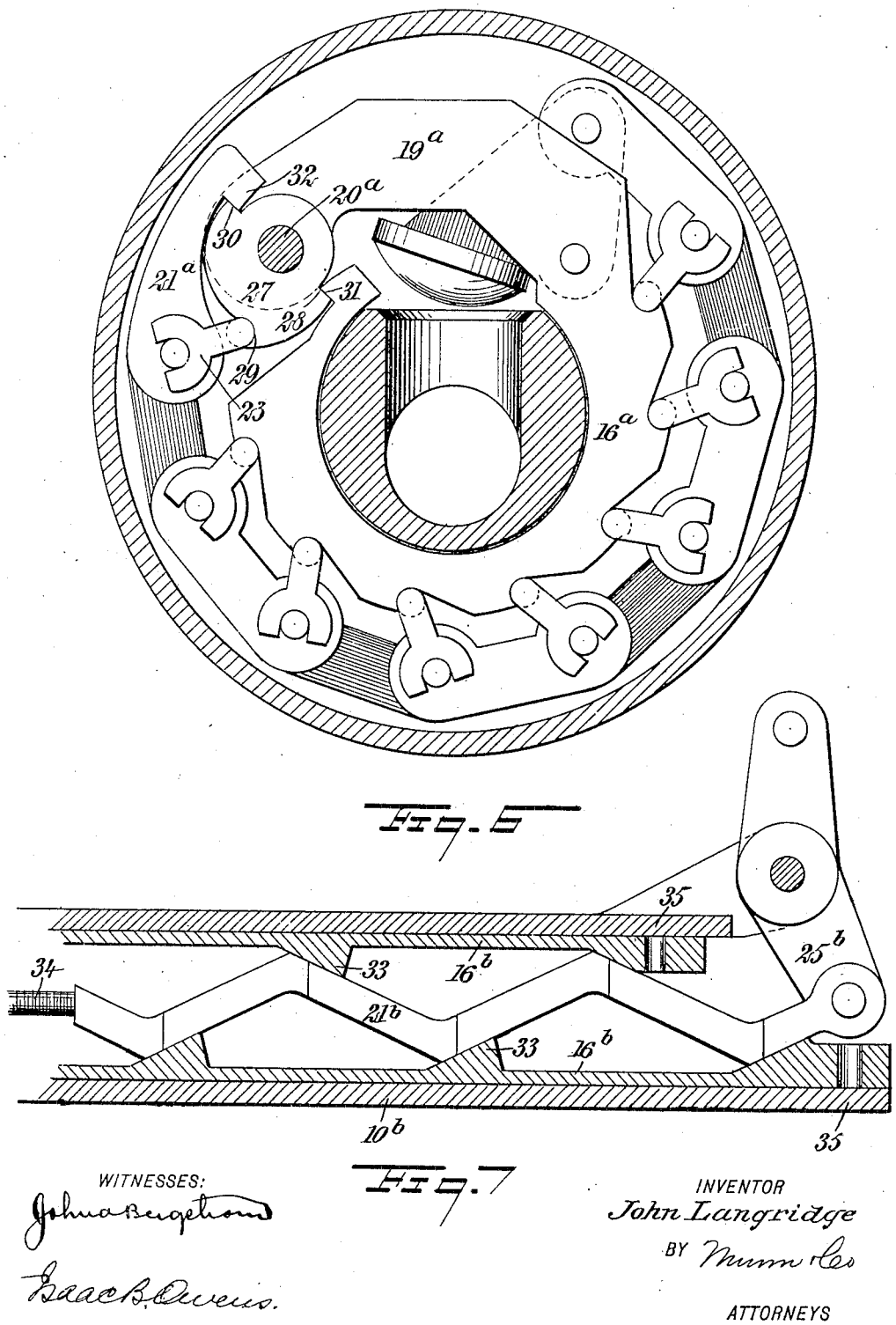
WITNESSES:
INVENTOR
John Langridge
BY
ATTORNEYS

UNITED STATES PATENT OFFICE.

JOHN LANGRIDGE, OF RAMSGATE, ENGLAND.

STEAM-TRAP.

No. 843,402.     Specification of Letters Patent.     Patented Feb. 5, 1907.

Application filed February 12, 1906. Serial No. 300,656.

*To all whom it may concern:*

Be it known that I, JOHN LANGRIDGE, a subject of the King of Great Britain, and a resident of Ramsgate, England, have invented a new and Improved Steam-Trap, of which the following is a full, clear, and exact description.

The invention relates to improvements in steam-traps or devices for permitting the flow of water while arresting the escape of steam; and it belongs to that class of traps in which the valve controlling the flow is automatically actuated by thermostatic devices, thus allowing the water to flow freely, but closing the valve as the temperature rises with the presence of steam in the trap, so that steam-flow through the trap is prevented.

My invention resides in certain special features of construction and arrangement of parts, which will be fully described hereinafter, and particularly pointed out in the claims.

Reference is had to the accompanying drawings, which illustrate several manners in which my invention may be practically embodied, and in which—

Figure 1 is a cross-sectional view of the trap. Fig. 2 is a section on the line 2 2 of Fig. 1. Fig. 3 is a detail of the expansion-collar. Fig. 4 is an edge view of the same. Fig. 5 is a detail of one of the rockers. Fig. 6 is a sectional view of a modification, and Fig. 7 is a sectional view of a further modification.

Referring first to Figs. 1 to 5, 10 indicates a casing, which is preferably circular in form and fitted with inlet and outlet connections 11 and 12. Communicating with the outlet 12 is a valve-seat 14, and this is commanded by the valve 15, which seats, favored by the pressure exerted through the inlet connection 11.

Encircling the seat 14 is the expansion-collar 16, which is split, as shown best in Fig. 3, and formed with side flanges 17, having notches 18 therein. From one end of the collar a bracket or arm 19 projects, and this is fastened to the casing 10 by an eccentric pin 20. The eccentricity of the pin 20 permits the adjustment of the expansion-collar with reference to the seat 14 and case 10 for a purpose which will hereinafter fully appear. Connected to the pin 20 is one end of the expansion-chain, which is composed of links 21, joined by pins 22, the ends of which project beyond the links to bear loosely on the forked ends of the U-shaped rockers 23. These rockers are seated loosely in the notches 18 of the expansion-collar. The expansion-chain extends around the collar 16 and has its free or second end connected by a pivot 24 with one end of a lever 25, which is fulcrumed at the base of the bracket 19 and carries the valve 15, before described.

Normally the parts stand in the position shown in Figs. 1 and 2, in which the expansion collar and chain are contracted and the valve 15 is open, allowing water or other fluid to flow freely through the trap. When, however, the temperature in the trap is raised—as, for instance, by the presence of steam—the parts 16 and 21 expand, and since opposite ends of these parts are fastened to the pin 20 said expansion is in opposite directions. This causes the angularity of the rockers 23 with respect to the chain 21 to be increased and permits such elongation of the chain as will seat the valve 15. By rotating the pin 20 the relative positions of the parts may be adjusted so as to insure correct operation. Upon a return of the normal or lower temperature the parts will in contraction reassume the position shown in the drawings, and the flow of water through the trap will be again permitted. Preferably the expansion-chain 21 is constructed of an alloy having a high coefficient of expansion, thus to increase the relative movements of the parts and insure rapidly and firmly seating the valve.

Fig. 6 shows a modification in which the pin $20^a$, holding the bracket $19^a$ to the case, is also provided with two disks 27, formed with shoulders 28, 29, and 30. The expansion-ring $16^a$ has a hook 31 thereon, which is engaged with the shoulder 28, while the end link $21^a$ of the expansion-chain has a hook 32 engaged with the opposite shoulder 30. The shoulder 29 sustains the end rocker $23^a$. In this manner the expansion-chain and the free end of the expansion-ring are joined to the anchor-pin $20^a$, the principle of operation being essentially the same as that before described.

In Fig. 7 an arrangement is shown in which a tubular case $10^b$ constitutes part of the fluid-passage, which is commanded by a valve similar to the valve 15 and operated by a lever $25^b$. This lever is actuated by a series of expansion-links $21^b$, similar in function to the expansion-chain and arranged in staggered relation between inclined abutments 33 on expansion-strips 16$^b$. The expansion-strips 16$^b$ are fastened to the tube 10$^b$, as indicated at 35, and 34 indicates a stop for holding the stationary end of the group of links 21$^b$. The strips 16$^b$ and links 21$^b$ expand in opposite directions, and the net result of this action is a movement of the lever 25$^b$ and the closing of the valve according to the principle of operation before described. The links 21$^b$, like the expansion-chains of Figs. 1 to 6, are preferably formed of an alloy of high expansive power, so as to increase the throw of the valve-actuating lever 25$^b$.

Having thus described my invention, I claim as new and desire to secure by Letters Patent—

1. A trap having a valve-actuating part, and two coacting expansion members, having their opposite ends connected and acting in opposite directions, one of said members being connected with the valve-actuated part.

2. A trap having a valve-actuating part, two coacting expansion members, one of which is in connection with the valve-actuating part, and means for anchoring opposite ends of said expansion members, for the purpose specified.

3. A trap having a valve-actuating part, and two coacting expansion members having their opposite ends connected and acting in opposite directions, one of said members being composed of engaged elements, and being connected with the valve-actuating part.

4. A trap having a valve-actuating part, two coacting expansion members, one of which is formed of a number of engaged elements and is in connection with the valve-operating part, and means for anchoring opposite ends of the expansion members, for the purpose specified.

5. A trap having a valve-operating part, two coacting expansion members, one of which is in connection with the valve-operating part, and means for adjustably anchoring opposite ends of the expansion members.

6. A trap having a valve-operating part, two coacting expansion members, one of which is in connection with the valve-actuating part, and an eccentric for adjustably anchoring opposite ends of said members.

7. A trap having a flexible expansion-chain, and a valve-operating part connected therewith.

8. A trap having a flexible expansion-chain, and a valve-operating part connected therewith, said chain expanding to close the valve.

9. A trap having two expansion members arranged to act in opposite directions, a rocker bearing loosely between said members, and a valve-operating part in connection with one member.

10. A trap having two expansion members arranged to act in opposite directions, a rocker bearing loosely between said members, a valve-operating part in connection with one member, and means for anchoring opposite ends of said members.

11. A trap having two expansion members, of which one is a chain, a valve-actuating part connected to one of said members, and a rocker bearing loosely between the said members.

12. A trap having a split expansion-collar, an expansion-chain encircling the same, a rocker bearing loosely between the collar and chain, and a valve-operating part connected with the chain.

13. A trap having a split expansion-collar, an expansion-chain encircling the same, a rocker bearing loosely between the collar and chain, a valve-operating part connected with the chain, and means for anchoring opposite ends of the collar and chain.

14. A trap having a casing, a valve commanding a passage through the same, a lever attached to the valve, a split expansion-collar, on one end of which the lever is fulcrumed, an expansion-chain connected to the lever, and rockers bearing loosely between the chain and collar.

15. A trap having a casing, a valve commanding a passage through the same, a lever attached to the valve, a split expansion-collar, on one end of which the lever is fulcrumed, an expansion-chain connected to the lever, rockers bearing loosely between the chain and collar, and means for anchoring the said end of the collar and the end of the chain opposite the lever.

16. A trap having an expansion-chain fixed at one end, a valve-operating part connected with the other end, and means for maintaining the links in substantial alinement with each other, whereby to transmit the expansion and contraction of the chain to the valve-operating parts.

In testimony whereof I have signed my name to this specification in the presence of two subscribing witnesses.

JOHN LANGRIDGE.

Witnesses:
W. EBIHARAH,
R. BAILLOD.